United States Patent Office.

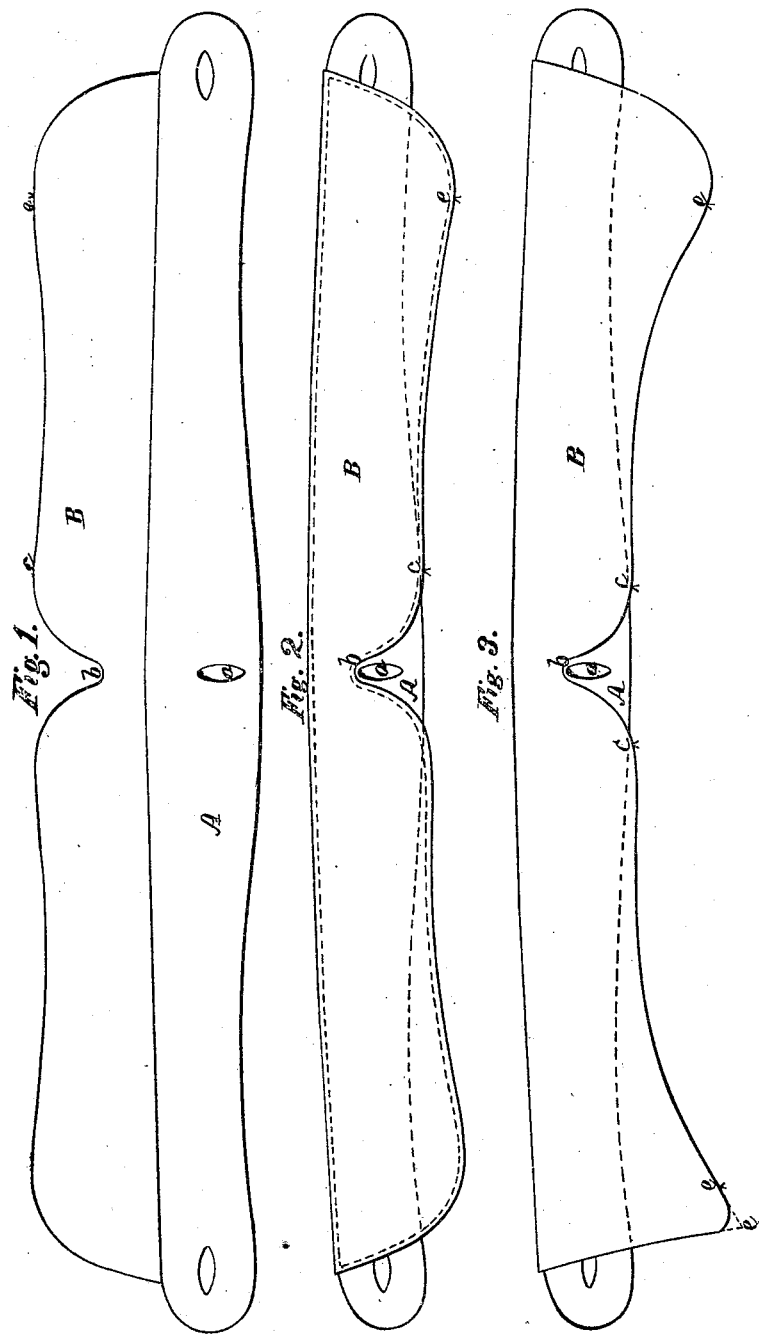

ED ELISHA MACK, OF ALBANY, NEW YORK.

Letters Patent No. 101,286, dated March 29, 1870.

IMPROVEMENT IN PAPER COLLARS.

The Schedule referred to in these Letters Patent and making part of the same.

*To all whom it may concern:*

Be it known that I, ED ELISHA MACK, of the city and county of Albany, State of New York, have invented certain new and useful Improvements in Collars; and I do hereby declare that the following is a full, clear, and exact description thereof, reference being had to the accompanying drawings forming a part of this specification, in which—

Figure 1 represents a collar opened up, showing the improvements.

Figure 3 represents a collar turned down, showing the utility of the improvements.

Figure 3 represents a collar of greater width, in two styles, and turned down, showing the improvements.

Collars, as have been made heretofore, have always been attended by two very undesirable features, which have been a source of inconvenience and a vexation to the wearer, which are these: The button-hole in the center of the band being covered by the collar when turned down inconveniences the wearer in buttoning the collar to the shirt, so much that he is obliged to button the collar to its place back before it is turned down, or be liable to have the collar wrinkled and injured in appearance if otherwise attached.

By my invention a collar can be made which will not be attended with this inconvenience or annoyance, and can be secured to the shirt as readily when turned down as when thrown up.

The nature of my invention consists in making in the lower edge of the collar, when turned down, a neat recess or narrow, deep scallop, which will exhibit the button-hole made in the band, which was heretofore covered by the said collar when turned down. By forming this deep recess or scallop in the lower edge of the collar, the band can be buttoned to the shirt without turning up the collar or in anywise marring its appearance.

To enable others skilled in the art to make and use my invention, I will proceed to describe it in reference to the accompanying drawings and the letters of reference marked thereon, the same letters indicating like parts.

In the drawings—

A represents the usual band.

B represents the collar.

*a* is the central button-hole.

Instead of continuing a uniform line of edge of the collar from end to end, I make in the edge of the collar, immediately over the button-hole *a*, a deep recess or scallop, *b*, fig. 1, which scallop or recess, when the collar is turned down, as in figs. 2 and 3, will exhibit the button-hole *a*, and give permission to the wearer to button the band A to the shirt without turning up the collar B.

Collars have been made with a uniform line of edge, so cut as to present a very narrow width of collar back, which depth would increase as it neared the front, so that when the collar was turned down its edge would be above the button-hole *a*, and would not fall over and cover the said button-hole, and, being thus made, the said collars would work over the collar of the vest back of the neck instead of under the same, as it should do, and by so doing would often disarrange its set. Collars thus made I do not claim.

Having described my invention,

What I claim, and desire to secure by Letters Patent, is—

The deep scallop or recess *b* in the turn-over portion B of the collar, as and for the purpose described.

ED ELISHA MACK.

Witnesses:
W. M. TICKNOR,
ALEX. SELKIRK.